US011888731B1

(12) United States Patent
Bhawsar et al.

(10) Patent No.: US 11,888,731 B1
(45) Date of Patent: Jan. 30, 2024

(54) CONGESTION NOTIFICATION FOR NETWORK COMMUNICATION

(71) Applicant: Avago Technologies International Sales Pte. Limited, Singapore (SG)

(72) Inventors: Vishal Bhawsar, Bangalore (IN); Vivek Kumar, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/092,848

(22) Filed: Jan. 3, 2023

(51) Int. Cl.
*G06F 15/16* (2006.01)
*G06F 9/54* (2006.01)
*H04L 29/06* (2006.01)
*H04L 45/50* (2022.01)
*H04L 47/122* (2022.01)
*H04L 45/24* (2022.01)

(52) U.S. Cl.
CPC .............. *H04L 45/50* (2013.01); *H04L 45/24* (2013.01); *H04L 47/122* (2013.01)

(58) Field of Classification Search
CPC ........ H04L 45/50; H04L 45/24; H04L 47/122
USPC .......................................................... 709/238
See application file for complete search history.

(56) References Cited

U.S. PATENT DOCUMENTS 7,990,965 B1 * 8/2011 Aggarwal ............. H04L 49/201 370/392
10,212,076 B1 * 2/2019 Morris .................... H04L 45/50
10,397,100 B1 * 8/2019 Morris .................... H04L 45/22
10,587,505 B1 * 3/2020 Morris .................... H04L 45/02
10,904,144 B2 * 1/2021 Morris .................. H04L 45/745
2002/0150056 A1 * 10/2002 Abadi ..................... H04L 45/16 370/256
2015/0263940 A1 * 9/2015 Kini ...................... H04L 45/507 370/236.2
2016/0014029 A1 * 1/2016 Yuan ....................... H04L 47/11 370/236
2016/0294696 A1 * 10/2016 Gafni ...................... H04L 47/10
2019/0356584 A1 * 11/2019 Nainar .................... H04L 45/04
(Continued)

OTHER PUBLICATIONS

E. Salvadori and R. Battiti, "A load balancing scheme for congestion control in MPLS networks," Proceedings of the Eighth IEEE Symposium on Computers and Communications. ISCC 2003, Kemer-Antalya, Turkey, 2003, pp. 951-956 vol. 2, doi: 10.1109/ISCC.2003.1214239. (Year: 2003).*
(Continued)

*Primary Examiner* — Hamza N Algibhah
(74) *Attorney, Agent, or Firm* — Foley & Lardner LLP

(57) ABSTRACT

Systems and methods are provided for congestion notification in network communications, including multi-protocol label switching (MPLS) network communications. In one or more implementations, an MPLS node that receives a data packet and detects congestion may generate a cloned copy of the data packet, add congestion information, such as a congestion notification label and a congestion notification header, into the data packet, and forward the cloned copy with the congestion notification label and the congestion notification header to a next MPLS node. The next MLPS node may, responsive to receiving the cloned copy with the congestion information, provide one packet with the congestion information to a subsequent node, and another packet with the congestion information to the node from which the cloned copy was received.

20 Claims, 9 Drawing Sheets

(56) References Cited

U.S. PATENT DOCUMENTS

| | | | | |
|---|---|---|---|---|
| 2020/0084147 | A1 * | 3/2020 | Gandhi | H04L 41/40 |
| 2021/0092056 | A1 * | 3/2021 | Wijnands | H04L 12/185 |
| 2021/0352009 | A1 * | 11/2021 | Van de Velde | H04L 45/74 |
| 2022/0210042 | A1 * | 6/2022 | Gandhi | H04L 45/50 |

OTHER PUBLICATIONS

Kompella, et al., “Allocating and Retiring Special-Purpose MPLS Labels,” Internet Engineering Task Force, retrieved from https://www.rfc-editor.org/rfc/rfc7274.html, Jun. 2014, 11 pages.

Rosen et al., “Multiprotocol Label Switching Architecture,” Network Working Group, retrieved from https://www.rfc-editor.org/rfc/rfc3031, Jan. 2001, 61 pages.

* cited by examiner

CONGESTION NOTIFICATION FOR NETWORK COMMUNICATION

TECHNICAL FIELD

The subject application relates generally to network communication including, for example, congestion notification for network communication.

BACKGROUND

Electronic devices can communicate with each other over wired or wireless networks. Multiprotocol label switching (MPLS) can be used to route network packets though the network from one client device to another client device via one or more routers, using labels for one or more paths through the network. MPLS can be used to route network packets for any of various access technologies.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring concepts of the subject technology.

Congestion management is a part of achieving a lossless network condition. Multi-protocol label switching (MPLS) networks, in general, can suffer from a lack of congestion management options. For example, traditional internet protocol (IP)-based networks rely on marking of Explicit Congestion Notification (ECN) bits in an IP header to detect and inform congestion in the network. End host processes can convey the ECN bits to the sender, which can then act to slow down the transmission rate for the packet flow. However, since MPLS networks can carry any type of traffic, relying on IP header ECN bits for congestion management does not work in many use cases.

MPLS networks also currently lack the ability to detect congestion per Forwarding Equivalence Class (FEC) and also lack the ability to notify a sending device of the congestion. Aspects of the subject technology provide for improved congestion management in a network, such as an MPLS network, including providing congestion management per FEC (e.g., per label). MPLS is described in RFC 3031, which is available at https://www.rfc-editor.org/rfc/rfc3031, and which is hereby incorporated herein by reference.

Figure 1:
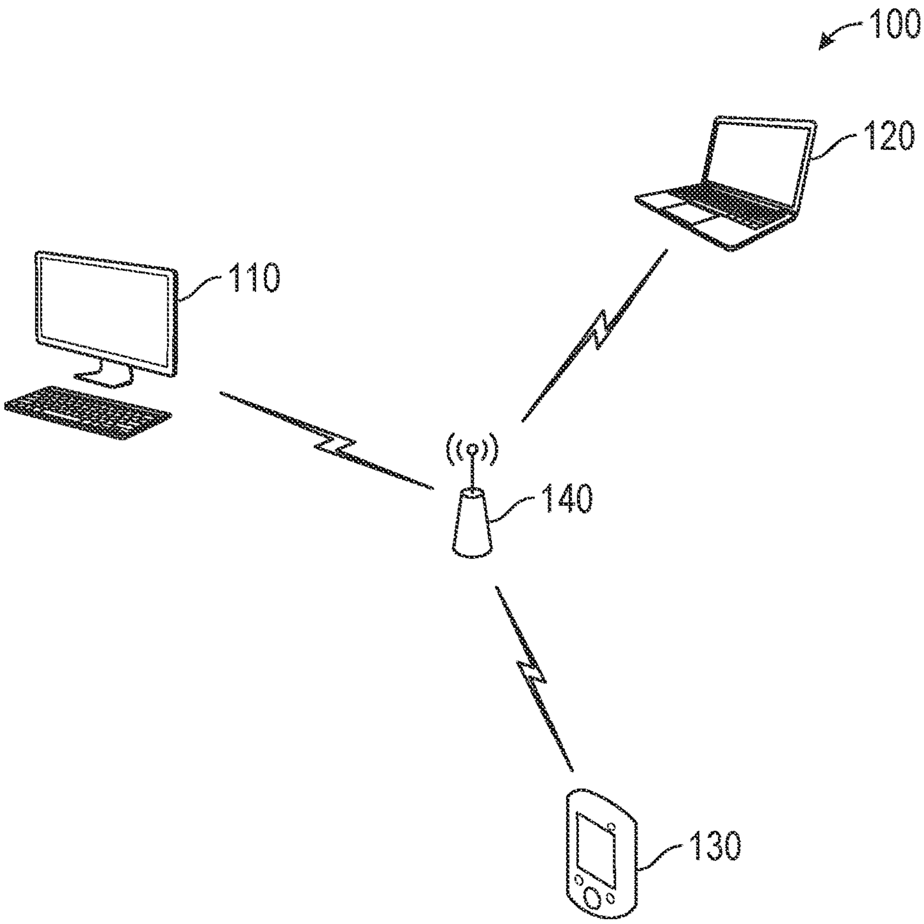
FIG. 1 illustrates an example network environment in which congestion notification for network communication may be implemented in accordance with aspects of the subject technology.

FIG. 1 illustrates an example network environment in which congestion management may be implemented in accordance with aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As depicted in FIG. 1, network environment 100 includes electronic devices 110, 120, 130, and 140. Electronic device 140 may be a base station, an access point, or a router that is configured to establish wired or wireless connection(s) and/or communication(s) with one or more of electronic device 110, 120, and 130, as part of a network. In addition, electronic devices 110, 120, and 130 may be configured to establish wireless connections directly with each other for wireless communications between the electronic devices. Although a single electronic device 140 is shown in FIG. 1, in one or more implementations, connections between one or more of the electronic devices 110, 120, and 130 and others of the electronic devices 110, 120, and 130 may be multi-hop connections via more than one electronic device 140. For example, the network environment 100 may be implemented as a packet switched network, such as a multi-protocol label switching (MPLS) network, which may include any number of routers (e.g., client routers and/or provider routers including provider edge routers) that route packets between electronic devices in the network.

In FIG. 1, electronic device 110 is depicted as a computer, electronic device 120 is depicted as a laptop computer, and electronic device 130 is depicted as a smartphone. The subject technology is not limited to these types of electronic devices. For example, one or more of electronic devices 110, 120, or 130 may be a portable computing device such as a laptop computer, a smartphone, a peripheral device (e.g., headphones, earbuds, wireless speakers, and the like), a tablet device, a set-top box, a content streaming device, a wearable device such as a smartwatch, a gaming console, a smart television, and the like. The electronic devices also may represent sensors, switches, controllers, cameras, and other electronic devices considered to be part of an Internet of Things (IoT). Each of electronic devices 110, 120, and 130, as well as electronic device 140 (e.g., a base station, access point, and/or router) may be, and/or may include all or part of, the electronic system discussed below with respect to FIG. 13.

Figure 2:
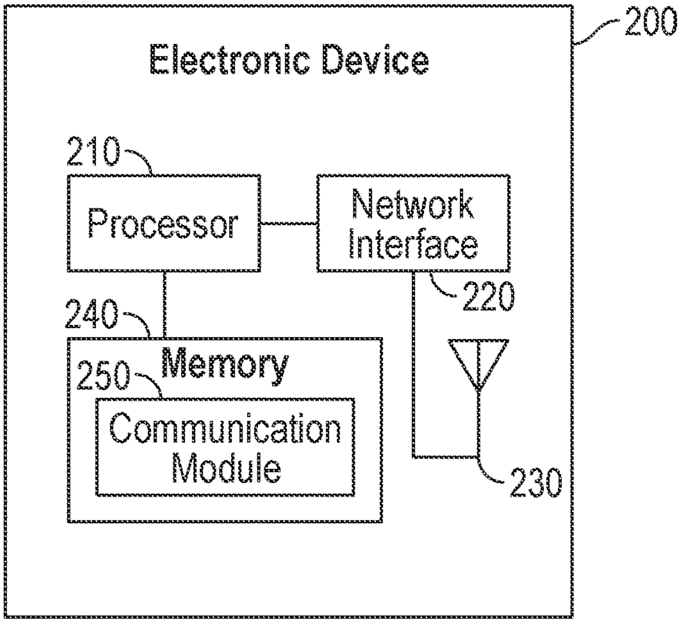
FIG. 2 is a block diagram illustrating components of an electronic device with which aspects of the subject technology can be implemented.

FIG. 2 is a block diagram illustrating components of an electronic device according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections or couplings between components are not limited to direct connections or direct couplings and may be implemented with one or more intervening components unless expressly stated otherwise.

In the example depicted in FIG. 2, electronic device 200 (which may be an implementation of any of the electronic devices 110, 120, 130 or 140 of FIG. 1) includes processor 210, network interface 220, antenna 230, and memory 240. Processor 210 may include suitable logic, circuitry, and/or code that enable processing data and/or controlling operations of electronic device 200. In this regard, processor 210 may be enabled to provide control signals to various other components of electronic device 200. Processor 210 also may control transfers of data between various portions of electronic device 200. Additionally, processor 210 may enable implementation of an operating system or otherwise execute code to manage operations of electronic device 200.

Processor 210 or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Network interface 220 may include suitable logic, circuitry, and/or code that enable the transmission and reception of data over one or more links between electronic device 200 and another electronic device using a wired connection and/or using antenna 230. Network interface 220 may include encoders, decoders, filters, analog-to-digital converters, digital-to-analog converters, power amplifiers, etc. Antenna 230 is depicted as being internal to electronic device 200 but may be implemented external to electronic device 200. While one antenna element is depicted in FIG. 2, electronic device 200 may be implemented using multiple antenna elements in any configuration. The subject technology is not limited to any particular type, number, or arrangement of antenna elements.

Memory 240 may include suitable logic, circuitry, and/or code that enable storage of various types of information such as received data, generated data, code, and/or configuration information. Memory 240 may include, for example, random access memory (RAM), read-only memory (ROM), flash memory, magnetic storage, optical storage, etc. As depicted in FIG. 2, memory 240 contains communication module 250. The subject technology is not limited to these components both in number and type, and may be implemented using more components or fewer components than are depicted in FIG. 2.

According to aspects of the subject technology, communication module 250 includes a computer program having one or more sequences of instructions or code together with associated data and settings. Upon processor 210 executing the instructions or code, one or more processes are initiated, for example, to establish and maintain one or more communication links with other electronic devices via network interface 220, to push (add), swap, or pop (remove) labels in data packets, determine which of several links to be used for transmission of data, detect and/or notify congestion, and/or to facilitate communication of data (e.g., packets, frames, symbols, etc.) between electronic device 200 and one or more other electronic devices via network interface 220. In one or more examples described herein, a device (e.g., electronic device 200, which may be an implementation of any of electronic devices 110, 120, 130, or 140) may perform a label action on one or more labels in a packet received over a network. Performing a label action may include pushing (adding) a label to the packet (e.g., to the top of a label stack of the packet), swapping a label in a packet with another label, or popping (removing) a label from a packet (e.g., from the top of a label stack of the packet).

In one or more examples described herein, a label may refer to a short (e.g., less than or equal to eight bytes, or less than or equal to four bytes), fixed length identifier of a Forwarding Equivalence Class (FEC). A label in a particular packet represents the Forwarding Equivalence Class to which that packet is assigned. A label may refer to a label as described in RFC 3031. A Forwarding Equivalence Class (FEC) may refer to a Forwarding Equivalence Class (FEC) as described in RFC 3031. In accordance with aspects of the subject technology, the figures and the following discussion include a number of terms, abbreviations, and acronyms. A legend is provided below for these terms, abbreviations, and acronyms:

CE: Customer Edge Router

PE: Provider Edge Router

LER: Label Edge Router

P: Provider Router

LSR: Label Switch Router

PW: Pseudowire

LSP: Label Switched Path, identified by a label

XL (4B). Extension label (Label value may be 15 as per RFC 7274, which is available from https://www.rfc-editor.org/rfc/rfc7274.html, and which is incorporated herein by reference), XL is label that indicates that an extended special-purpose label (ESPL) follows.

CNL—Congestion notification label: CNL may be an extended special-purpose label (ESPL) and can be assigned any value from 16-239 as per RFC 7274. The presence of this label may indicate that a congestion notification header is present (e.g., after this congestion notification label).

Congestion Notification (CN) Header:

```
+++++++++++++++++++++++++++++++++++++++++++++++
|Version|Msg_type|Queue_id|      Device_ID      |
+++++++++++++++++++++++++++++++++++++++++++++++
|           Opaque_data/MMU_stat               |
+++++++++++++++++++++++++++++++++++++++++++++++
|     Ingress port      |     Egress port      |
+++++++++++++++++++++++++++++++++++++++++++++++
```

Version: (e.g., 2 bits). Specifies a version of CN header. This field may be equal to one for the above header definition and subjected to change.

Msg_type: (e.g., 2 bits)

00: Congestion notification towards destination of switched copy

01: Congestion notification towards source of LSP/PW tunnel

10: Reserved

11: Reserved

Queue_id: (e.g., 8 bits) Identifier of which particular queue of the switch is experiencing congestion for a particular packet.

Device_ID: (e.g., 20 bits) Identifier of a node that is experiencing congestion.

Opaque_data/MMU_stat: (e.g., 32 bit): Available bits for administrator data.

Ingress port: (e.g., 16 bits) Identifier of which port on the congestion node at which the packet ingressed.

Egress port: (e.g., 16 bits) Identifier of which port on the congestion node at which the packet egressed.

Aspects of the subject technology can address various challenges for congestion management in MPLS. For example, because MPLS LSPs are unidirectional, a node experiencing congestion conventionally does not directly report the congestion to the sender. As another example, MPLS nodes work on a top-most label. Accordingly, an MPLS node does not operate below the label on which that node is applying a forwarding action. In the case of multiple labels in a packet, if the node experiences congestion when processing the top most label then the source of congestion can be any LSP/PW tunnel below the top label. Aspects of the subject technology provide a mechanism to inform all of the LSP/PW tunnel sources along the path about the congestion.

In one example use case, a node, P2, is an LSR node which swaps a label L1 to a label L1'. Without the benefit of the subject technology, node P2 does not operate with respect to any labels below the L1 label. If this node P2 experiences congestion on L1, then it would be desirable to be able to inform all of the sources which are sending traffic under label L1 of the congestion. For example, if there are three MPLS labels L1, L2, and L3 in a packet with the top label being L1, and congestion is experienced on L1, then it would be desirable for a congestion notification to be sent to the nodes that are pushing labels L2 and L3 because those nodes are the sources of traffic that use the LSP L1.

Aspects of the subject technology address these issues and provide mechanisms for detection of congestion and notification of congestion to all the nodes in MPLS network which are sources of traffic. Various examples are described hereinafter in the context of bidirectional co-routed LSPs. However, the subject technology can also be applied in cases in which bidirectional LSPs are not co-routed.

As described in further detail hereinafter, aspects of the subject technology provide a mechanism to detect congestion and to relay a notification of the congestion back to all possible sources of the congestion. Once a node has been notified that it is a possible source of congestion, the node can take action to reduce the congestion (e.g., by slowing transmissions from that node) according to any suitable congestion management algorithm that can be applied to the data provided in a congestion notification message.

Figure 3:
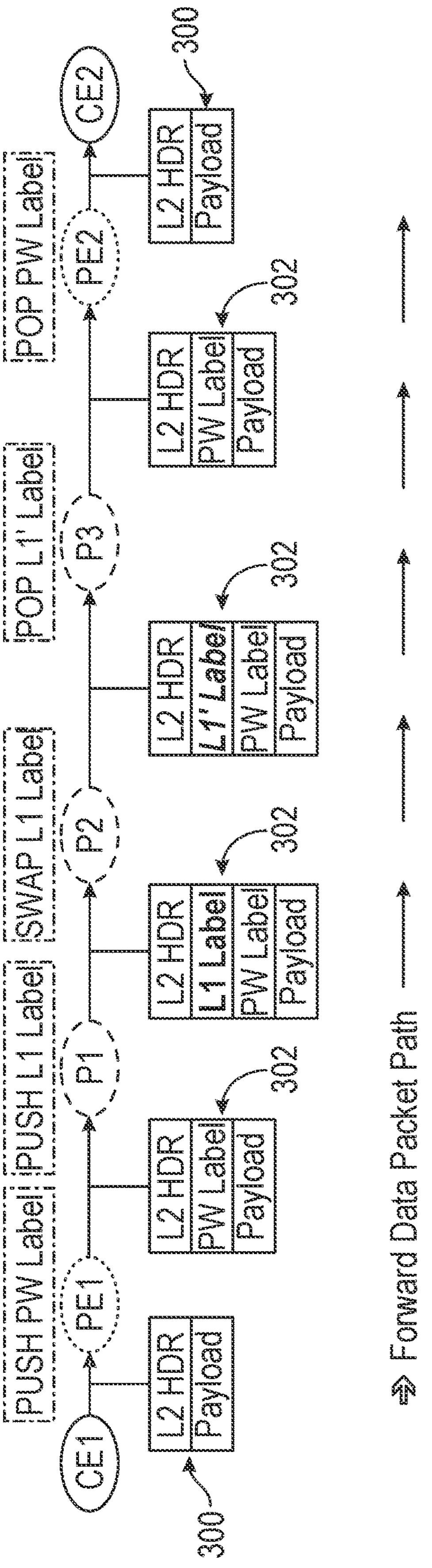
FIG. 3 illustrates a schematic block diagram of an MPLS packet flow through an MPLS network in a forward direction in accordance with aspects of the subject technology.

FIG. 3 illustrates a schematic block diagram of an MPLS packet flow through an MPLS network in a forward direction, in a use case without congestion, in accordance with aspects of the subject technology. As illustrated in FIG. 3, a client edge router CE1 (e.g., implemented by the electronic device 110, 120, 130, or 140, or another electronic device) may provide a client packet 300 to a provider edge router PE1 (e.g., implemented by the electronic device 110, 120, 130, or 140, or another electronic device). The client packet 300 may be a packet that includes a header (e.g., a layer 2 (L2) header or a layer 3 (L3) header) and a payload. In general, a packet may be a unit of data a single package that travels along a given network path.

In this example, PE1 pushes an MPLS layer, and PE1 and PE2 perform MPLS encapsulation and decapsulation. As shown, the provider edge router PE1 may push a service label or a pseudowire label (PW label) onto the label stack 302 of the client packet 300 and provide the client packet 300 (with the updated label stack 302) to a provider router P1 (e.g., implemented by the electronic device 110, 120, 130, or 140, or another electronic device). As shown, the provider router P1 pushes an LSP identified by label L1 onto the label stack 302 of the client packet 300 and provides the client packet 300 (with the updated label stack 302) to a provider router P2 (e.g., implemented by the electronic device 110, 120, 130, or 140, or another electronic device). As shown, the provider router P2 swaps the L1 label with an L1' label in the label stack 302 of the client packet 300 and provides the client packet 300 (with the updated label stack 302) to a provider router P3 (e.g., implemented by the electronic device 110, 120, 130, or 140, or another electronic device).

As shown, the provider router P3 pops the label L1' from the label stack 302 of the client packet 300 and provides the client packet 300 (with the updated label stack 302) to a provider edge router PE2 (e.g., implemented by the electronic device 110, 120, 130, or 140, or another electronic device). As shown, the provider edge router PE2 pops the PW label from the label stack 302 of the client packet 300 and provides the original client packet 300 to a destination client edge router CE2 (e.g., implemented by the electronic device 110, 120, 130, or 140, or another electronic device).

Figure 4:
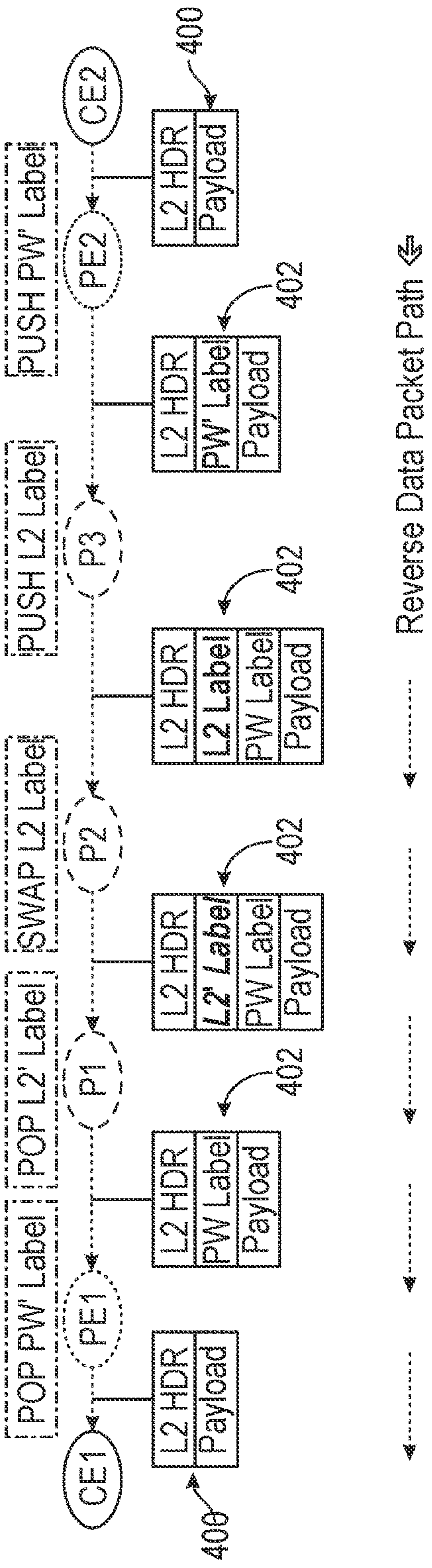
FIG. 4 illustrates a schematic block diagram of an MPLS packet flow through an MPLS network in a reverse direction in accordance with aspects of the subject technology.

FIG. 4 illustrates a schematic block diagram of an MPLS packet flow through the MPLS network of FIG. 3 in a reverse direction, in a use case without congestion, in accordance with aspects of the subject technology. As illustrated in FIG. 4, the client edge router CE2 may provide a client packet 400 to the provider edge router PE2. The client packet 400 may include a header (e.g., a layer 2 (L2) header or a layer 3 (L3) header) and a payload.

As shown, the provider edge router PE2 may push a service label or a pseudowire label (PW' label) onto the label stack 402 of the client packet 400 and provide the client packet 400 (with the updated label stack 402) to the provider router P3. As shown, the provider router P3 pushes an LSP identified by label L2 onto the label stack 402 of the client packet 400 and provides the client packet 400 (with the updated label stack 402) to the provider router P2. As shown, the provider router P2 swaps the L2 label with an L2' label in the label stack 402 of the client packet 400 and provides the client packet 400 with the updated label stack 402 to the provider router P1.

As shown, the provider router P1 pops the label L2' from the label stack 402 of the client packet 400 and provides the client packet 400 (with the updated label stack 402) to the provider edge router PE1. As shown, the provider edge router PE1 pops the PW' label from the label stack 402 of the client packet 400 and provides the original client packet 400 to the client edge router CE1. In the examples of FIGS. 3 and 4, three provide routers P1, P2, and P3 are shown. However, it is understood that any number of provider routers may be interposed between the provider edge routers PE1 and PE2. In various examples described herein, the provider edge routers PE1 and PE2, and the provider routers P1, P2, and P3 are referred to as nodes of the MPLS network including the provider edge routers PE1 and PE2, and the provider routers P1, P2, and P3.

In some examples herein, MPLS nodes (LSRs and/or LERs) may be classified as (i) congestion detection nodes, (ii) congestion notification nodes, or (iii) congestion reaction nodes. For example, a congestion detection node may be a node that is experiencing congestion and detects the congestion, and/or a node that detects congestion at another node. For example, any MPLS node that is performing LSP/PW initiation/termination or swap operations can experience and/or detect congestion. As discussed in further detail hereinafter, a congestion detection node may detect congestion at that node, clone an incoming packet and add a congestion header (e.g., with a Msg_type of one) to the cloned packet, and send this cloned packet with the congestion header towards the destination of the switched copy.

In one or more implementations, a congestion notification node may include any node that generates a congestion notification for a source of a LSP/PW tunnel (e.g., any MPLS node terminating a LSP/PW tunnel (e.g., performing a POP operation) while receiving a congestion notification packet with a Msg_type of zero. As discussed in further detail hereinafter, a congestion notification node may generate a congestion notification message with a Msg_type of one for the source of LSP/PW tunnel in order to slow down the transmission rate of the congested packet flow using that LSP/PW tunnel path. In one or more implementations, a congestion reaction node may be any node that receives a congestion message with a Msg_type of one (e.g., as generated by a congestion notification node). A congestion reaction node that receives a congestion message with a Msg_type of one may react to receiving the congestion message by slowing down the transmission rate from that node.

Figure 5:
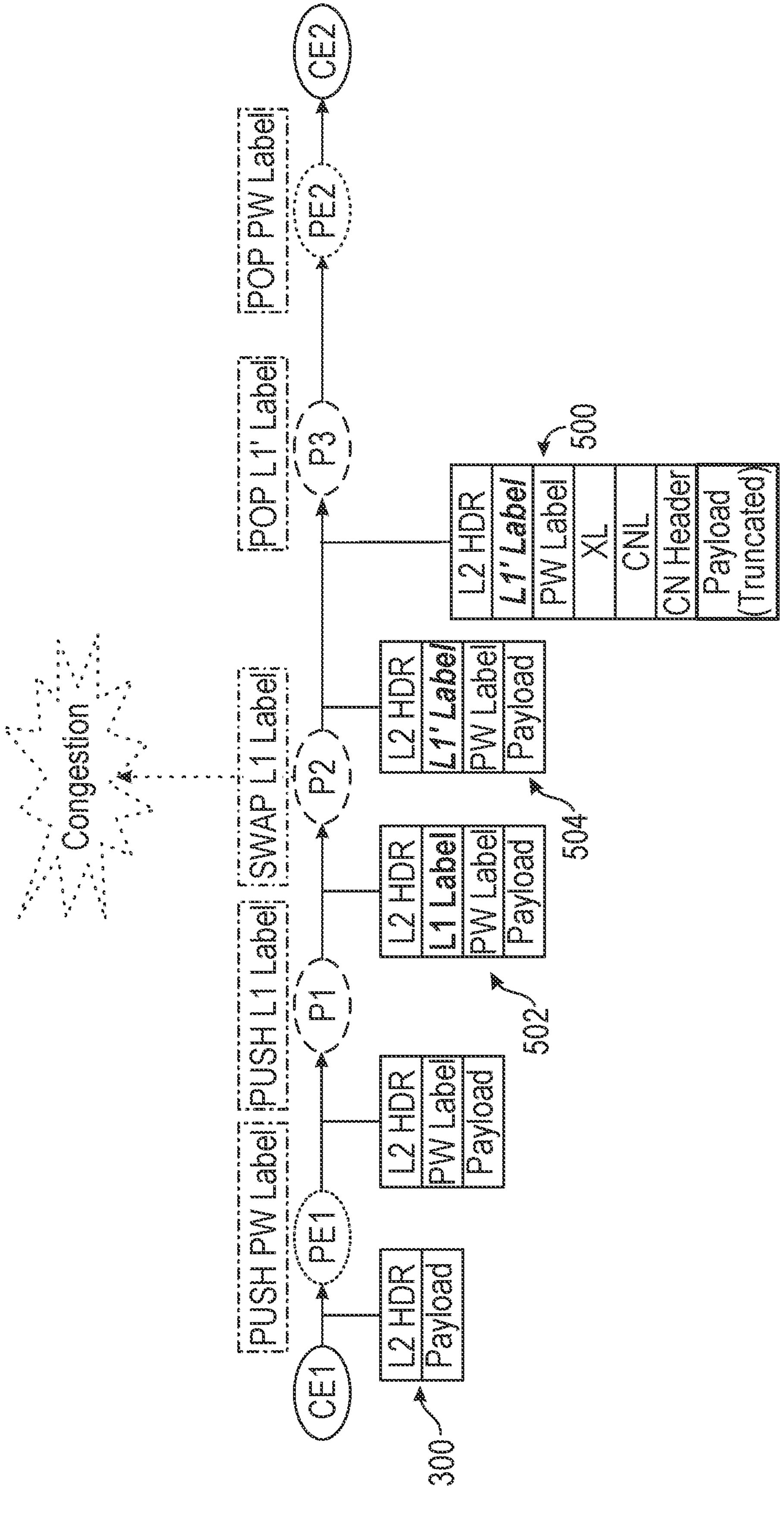
FIG. 5 illustrates a schematic block diagram of an MPLS network in a use case in which congestion is detected by a congestion detection node in accordance with aspects of the subject technology.

As one illustrative example, FIGS. 5-10 illustrate a use case in which the network (e.g., an MPLS network) of FIGS. 3 and 4 experiences congestion and generates, and operates based on, a congestion notification. In the example of FIG. 5, congestion is detected by a provider router P2 (e.g., a congestion detection node) in accordance with aspects of the subject technology. In the example of FIG. 5, an MPLS data packet has experienced congestion on a particular queue assigned to this data packet. For example, the congestion may be detected by the provider router P2 (in this example) by detecting that a queue depth has crossed a threshold for this particular queue). However, congestion may be detected using any of various congestion detection operations. In one or more implementations, congestion may refer to network congestion. Network congestion may refer to a reduction in quality of service (QOS) relating to packet loss, queueing delay, and/or blocking of new connections in one or more implementations. In various implementations, detecting congestion may include, for example, detecting a saturated network interface, detecting an increase in latency, detecting an increase in buffer filling (e.g., a queue depth increase, such as above a threshold), and/or detecting an increase in packet loss. In various implementations, detecting congestion may include detecting congestion by a device that is experiencing the congestion (e.g., by detecting a queue depth at the device that is above a threshold depth or by detecting saturation on a network interface at the device), or may include detecting congestion, by a device, that is occurring at another device (e.g., by detecting packet loss in communications from the other device).

In the example of FIG. 5, one or both of nodes P1 and PE1 may be the source of congestion. Aspects of the subject technology provide for these nodes P1 and PE1 to be notified of the congestion (e.g., so that the nodes P1 and/or PE1 can take action, such as by reducing a transmission rate from that node). For example, as shown in FIG. 5, the node P2 may generate a cloned copy 500 of the incoming packet 502 from node P1, add a congestion notification label (CNL) and a congestion notification header (CN header) into the cloned copy, perform the normal label action of swapping the L1 label with the L1' label (e.g., as described herein in connection with FIG. 2) in the cloned copy 500, and forward the cloned copy 500 with the updated label stack and the CN header to the provider router P3 (e.g., the next HOP). As shown, the node P2 may also generate a switch copy 504 of the incoming data packet from node P1 by performing its normal label action of swapping the L1 label with the L 1' label (e.g., as described herein in connection with FIG. 2) and forwarding this switch copy 504 to the provider router P3 (e.g., the next HOP).

As shown in FIG. 5, the congestion detection node P2 may also add an extension label (XL) in the cloned copy 500 to indicate that an extended special-purpose label (ESPL, e.g., the CNL) follows the XL in the label stack of the cloned copy 500. As shown, the congestion detection node P2 may also truncate (e.g., shorten, omit or zero out) the payload in the cloned copy 500. The cloned copy 500 may be provided to the same egress PE router (e.g., PE2) as the switch copy 504. In one or more implementations, the congestion detection node P2 may also assign a highest priority to the cloned copy 500 so that the cloned copy 500 reaches the egress PE router as soon as possible, so that egress PE can send a congestion notification message for the ingress PE router in the reverse direction (as described hereinafter in connection with FIG. 7). Since the congestion notification (e.g., the cloned copy 500 including the CNL and the CN header) is going towards destination of the switch copy 504, the node P2 may set the Msg_type field in the CN header to zero (e.g., indicating that the congestion notification is moving towards the destination of the switch copy 504). In one or more implementations, the node P2 may also store a copy of the incoming packet 502 (e.g., by copying the incoming packet 502 to its local processor), such as for later diagnostic purposes.

Figure 6:
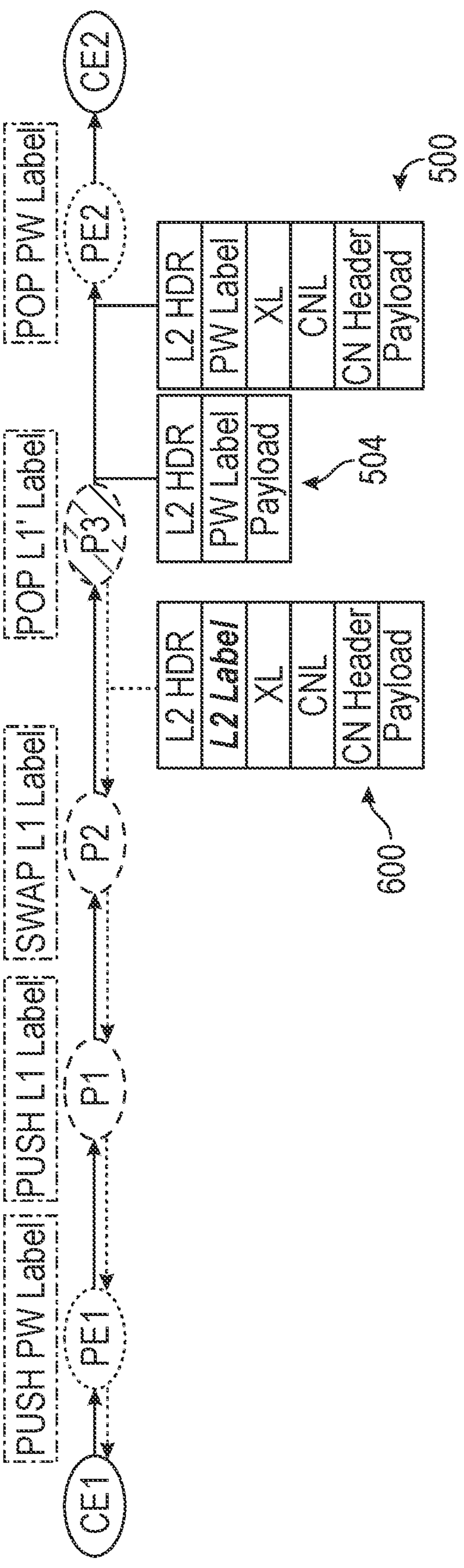
FIG. 6 illustrates a schematic block diagram of an MPLS network in a use case in which forward and reverse congestion notifications are provided by a congestion notification node in accordance with aspects of the subject technology.

FIG. 6 illustrates operations that may be performed by the node P3 that receives the cloned copy 500 and the switch copy 504 from the node P2. The node P3 may parse the label stack of the cloned copy 500 to determine whether a CNL is present in the label stack. As shown, the node P3 is popping the LSP label L1', which means the LSP which runs between node P1 and P3 is being terminated. In the example of FIG. 6, the CNL is present in the label stack, and the node P3 responsively performs its normal label popping action (e.g., popping the L1' label) on the cloned copy 500 as well as the switch copy 504. The cloned copy 500 and the switch copy 504 may then be forwarded to the next hop (e.g., the provider edge router PE2).

As shown in FIG. 6, responsive to determining that the CNL is present in the label stack of the cloned copy 500, the node P3 may also inject a congestion notification message 600 in the reverse direction. For example, since the node P3 is terminating the LSP, the node P3 has a reverse path to reach the source of this LSP (e.g., P1). Accordingly, the node P3 may inject the congestion notification message 600 back to node P1 with Label L2 as a congestion indication on this terminated LSP path. As this congestion notification message 600 is going back to the LSP initiator node (e.g., the source node), the node P3 may set the Msg_type field in the CN header to one (e.g., indicating a congestion notification towards source of the LSP/PW tunnel). In one or more implementations, other fields of the CN header may be unchanged by the node P3. In one or more implementations, the node P3 may also store a copy of the cloned copy 500 and/or switch copy 504 (e.g., by copying the incoming packet(s) to its local processor), such as for later diagnostic purposes.

Figure 7:
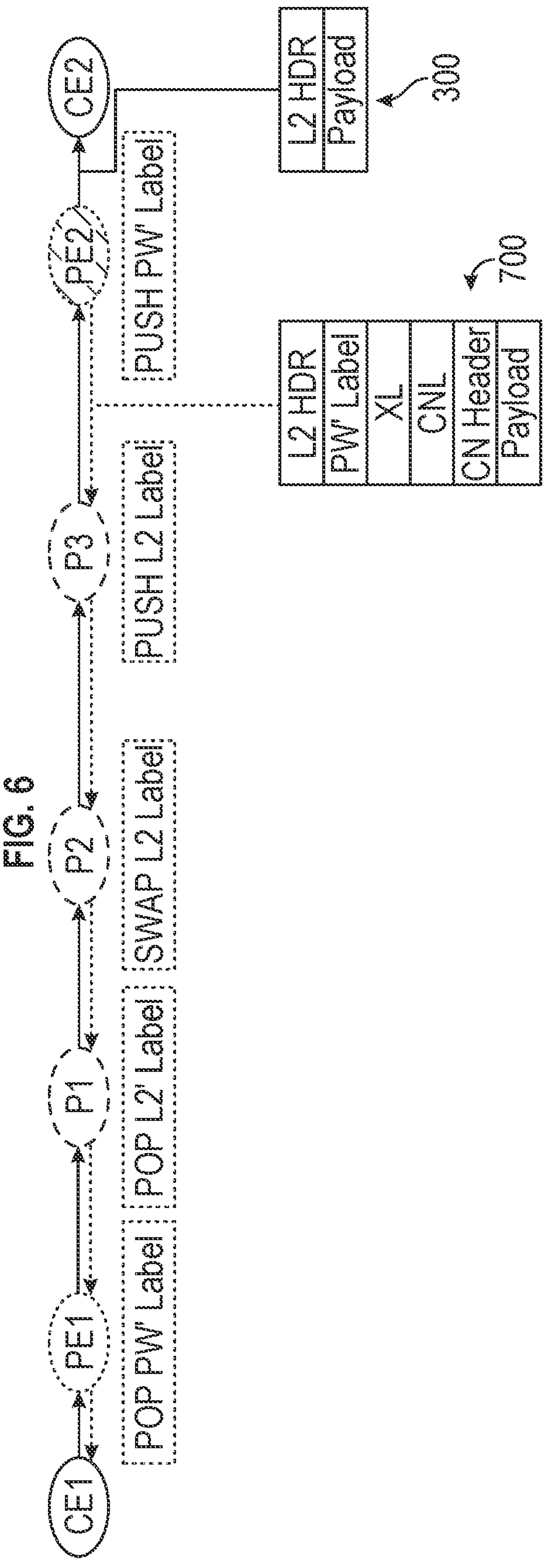
FIG. 7 illustrates a schematic block diagram of an MPLS network in a use case in which a reverse congestion notification is provided by a congestion notification node in accordance with aspects of the subject technology.

FIG. 7 illustrates operations that may be performed by the node PE2 that receives the cloned copy 500 and the switch copy 504 from the node P3. The node PE2 may parse the label stack of the cloned copy 500 to determine whether a CNL is present in the label stack. As shown, the node PE2 is popping the PW label, which means the PW tunnel which runs between nodes PE1 and PE2 is being terminated. As shown, the node PE2 performs its normal label popping action (e.g., popping the PW label) on the switch copy 504, and provides the resulting client packet 300 to the node CE2.

In the example of FIG. 7, the CNL label is just after the popped PW label, which indicates to the node PE2 that the congestion notification message in the cloned copy 500 is for the PW tunnel which is being terminated at this node. As shown in FIG. 7, responsive to determining that the CNL is present in the label stack of the cloned copy 500, the node PE2 may also inject a congestion notification message 700 in the reverse direction. For example, since the node PE2 is terminating the PW tunnel, the node PE2 has a reverse path to reach the source of this PW tunnel (e.g., PE1). Accordingly, the node PE2 may inject the congestion notification message 700 back to node PE1 with the PW' label, as a congestion indication on this terminated PW path. As this congestion notification message 700 is going back to the PW initiator node (e.g., the source node), the node PE2 may set the Msg_type field in the CN header to one (e.g., indicating a congestion notification towards source of the LSP/PW tunnel). In one or more implementations, other fields of the CN header may be unchanged by the node PE2. In one or more implementations, the node PE2 may also store a copy of the cloned copy 500 and/or switch copy 504 (e.g., by copying the incoming packet(s) to its local processor), such as for later diagnostic purposes.

Figure 8:
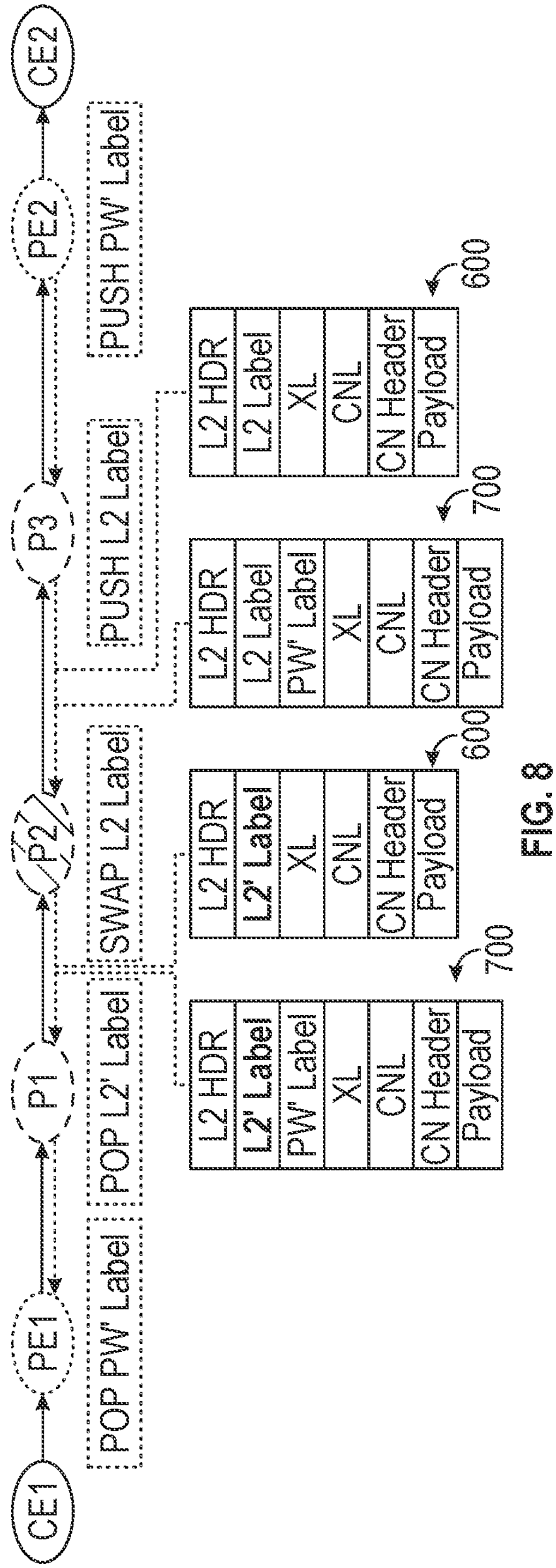
FIG. 8 illustrates a schematic block diagram of an MPLS network in a use case in which a label swap node performs a label action on label stacks including congestion notifications in accordance with aspects of the subject technology.

FIG. 8 illustrates operations that may be performed by the node P2 that receives (in the reverse direction) the congestion notification message 600 from the node P3 and the congestion notification message 700 from the node PE2 (e.g., after the node P3 pushes the label L2 onto the label stack of the congestion notification message 700 upon receiving the congestion notification message 700 from PE2). The node P2 may parse the label stack of the congestion notification message 600 and the congestion notification message 700 to determine whether a CNL is present in the label stack of the congestion notification message 600 and/or the congestion notification message 700. As shown, the node P2 may forward the incoming packet as per its label action configured with label L2 (e.g., by swapping the L2 label with the L2' label in both the congestion notification message 600 and the congestion notification message 700, and forwarding the congestion notification message 600 and the congestion notification message 700 (with the updated label stacks) to the node P1). Responsive to determining that the CNL is present in the label stack of the congestion notification message 600 and the congestion notification message 700, the node P2 store a copy of the incoming congestion notification message 600 and/or the incoming congestion notification message 700 from P3 (e.g., by copying the incoming packet(s) to its local processor), such as for later diagnostic purposes.

As the node P2, in this example, is swapping the incoming label and not terminating the incoming label, the node P2 is not the source of traffic for this LSP path, and the node P2 may not process or take any congestion-reduction action based on the congestion message(s). In contrast, the nodes P1 and PE1 may process the congestion message(s), and modify their operations, such as to slow their transmission rate(s) to reduce the congestion.

Figure 9:
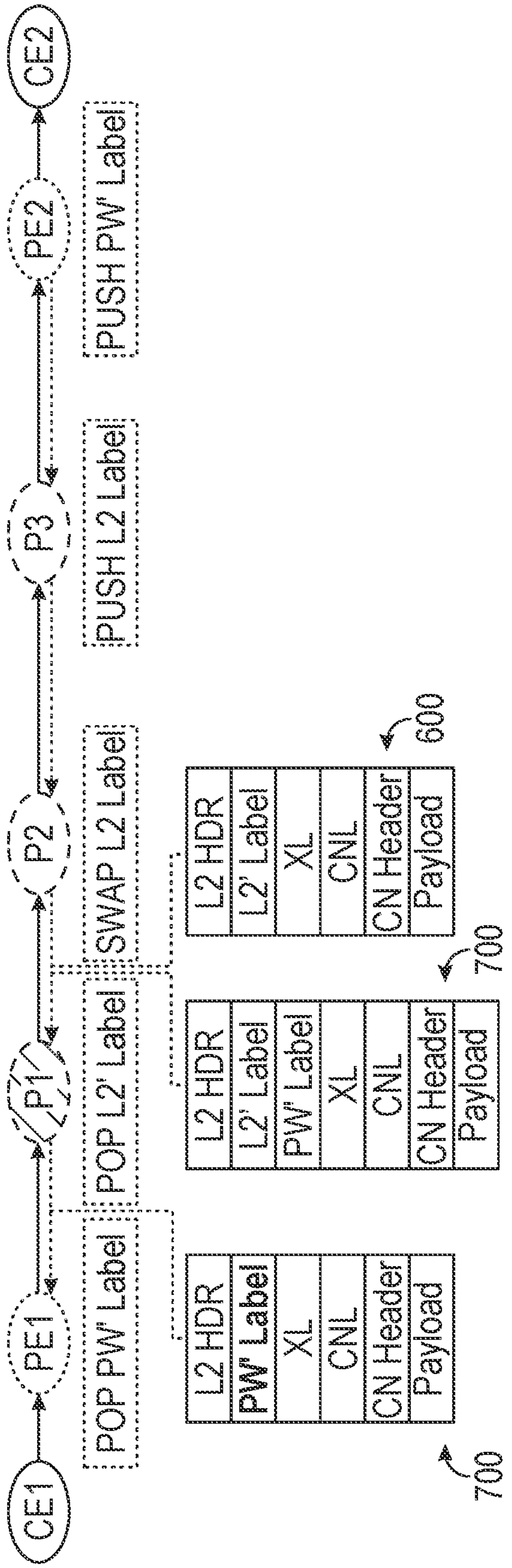
FIG. 9 illustrates a schematic block diagram of an MPLS network in a use case in which a congestion reaction node operates on label stacks including congestion notifications in accordance with aspects of the subject technology.

For example, FIG. 9 illustrates operations that may be performed by the node P1 that receives (in the reverse direction) the congestion notification message 600 and the congestion notification message 700 from the node P2. The node P1 may parse the label stack of the congestion notification message 600 and the congestion notification message 700 to determine whether a CNL is present in the label stack of the congestion notification message 600 and/or the congestion notification message 700. As shown, the node P1 may forward the congestion notification message 700 as per its label action (e.g., by popping the L2' label in the congestion notification message 700, and forwarding the congestion notification message 700 to the node PE1).

Responsive to determining that the CNL is present in the label stack of the congestion notification message 600, the node P1 may determine that the CNL label is just after the popped label, and determine, responsively, that the congestion notification message 600 is for the LSP tunnel which is being terminated at this node. The node P1 may then parse the CN header in the congestion notification message 600 to check if the Msg_type is equal to one (e.g., indicating that the congestion notification is a notification towards source of LSP/PW tunnel). Responsive to detecting the Msg_type equal to one along with the label L2', the node P1 may determine that traffic being sent on Label L1 towards P1→P3 is experiencing congestion in the other direction. Responsively, the node P1 may slow down the traffic that is being transmitted from P1 to P3 on label L1 in the forward direction.

The node P1 may also determine that the CNL label with the Msg_type of 1 is not exposed after the popped L2' label in the congestion notification message 700, and determine, responsively, that the congestion notification message 700 is not for this node. In this case, the node P1 may forward this packet (e.g., the congestion notification message 700 after popping of the L2' label, as indicated in FIG. 9) to the next node (e.g., PE1) using a high priority queue. Responsive to determining that the CNL is present in the label stack of the congestion notification message 600 and the congestion notification message 700, the node P1 may store a copy of the incoming congestion notification message 600 and/or the incoming congestion notification message 700 from P2 (e.g., by copying the incoming packet(s) to its local processor), such as for later diagnostic purposes.

Figure 10:
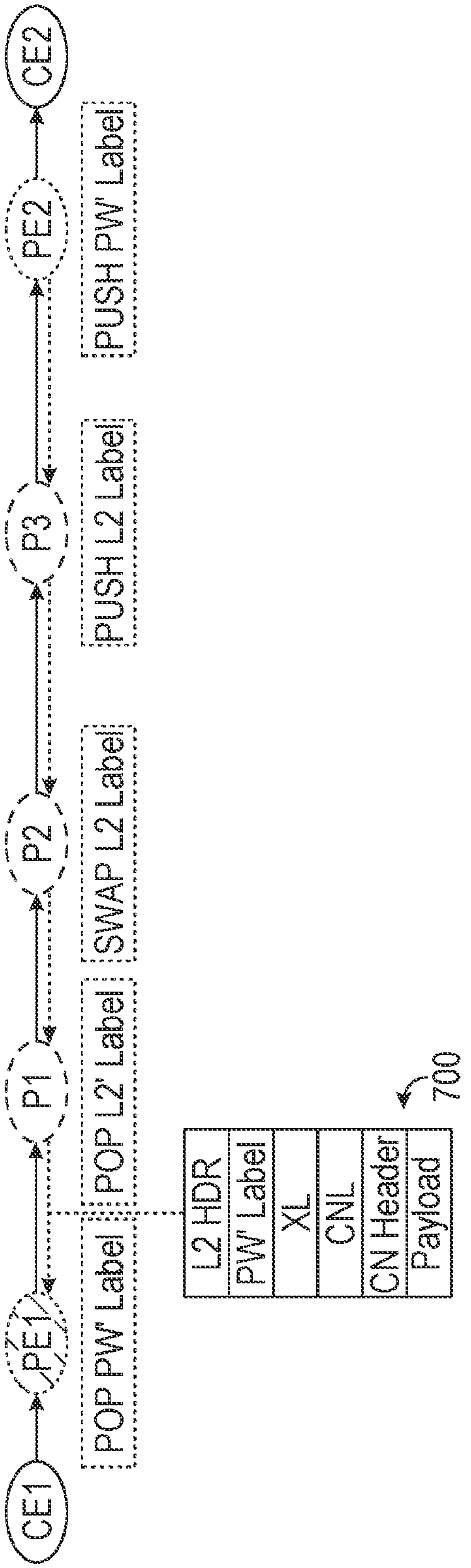
FIG. 10 illustrates a schematic block diagram of an MPLS network in a use case in which a congestion reaction node operates on a label stack including a congestion notification in accordance with aspects of the subject technology.

FIG. 10 illustrates operations that may be performed by the node PE1 that receives (in the reverse direction) the congestion notification message 700 from the node P1. The node PE1 may parse the label stack of the congestion notification message 700 to determine whether a CNL is present in the label stack of the congestion notification message 700.

Responsive to determining that the CNL is present in the label stack of the congestion notification message 700, the node PE1 may pop the PW' label as per its label action, and may determine that the CNL label is just after the popped PW' label, indicating that the congestion notification message 700 is for the PW tunnel which is being terminated at this node. Responsive to exposing the CNL label in this way, the node P1 may then parse the CN header in the congestion notification message 700 to determine whether the Msg_type is equal to one (e.g., indicating that the congestion notification is a notification towards source of LSP/PW tunnel). Responsive to detecting the Msg_type equal to one along with the label PW', the node PE1 may determine that traffic being sent on label PW towards PE1→PE2 is experiencing congestion in the other direction. Responsively, the node PE1 may slow down the traffic that is being transmitted from PE1 to PE2 on label PW in the forward direction.

As illustrated in the example of FIGS. 5-10, a congestion notification mechanism disclosed herein can be used to indicate congestion in an MPLS network on a per MPLS label or per (MPLS, EXP) basis. In the example of FIGS. 5-10, congestion is detected a middle one of three provider routers in an MPLS network, and corresponding actions by other provider routers and/or provider edge routers in the MPLS network are described. However, it is appreciated that this is merely an example, and the operations described in connection with FIGS. 5-10 can be applied when congestion is detected by any provider router or provider edge router in an MPLS network having any number of provider routers.

Figure 11:
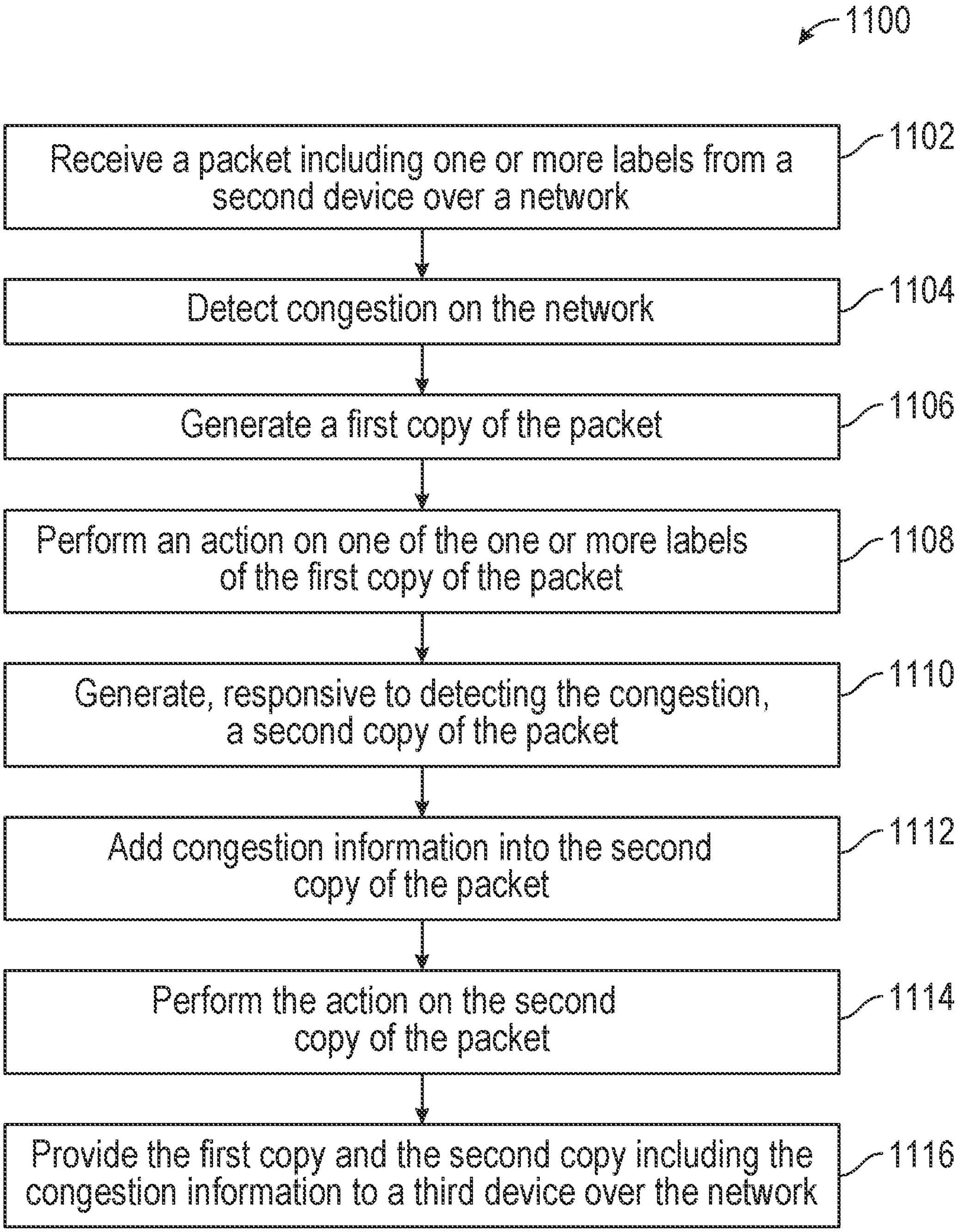
FIG. 11 illustrates a flowchart of illustrative operations that may be performed for congestion notification in accordance with aspects of the subject technology.

FIG. 11 is a flowchart illustrating an example process for congestion notification according to aspects of the subject technology. For example, the process 1100 of FIG. 11 may be performed by a congestion detection node of an MPLS network in one or more implementations. For explanatory purposes, the blocks of the process illustrated in FIG. 11 are described herein as occurring in serial, or linearly. However, multiple blocks of the process may occur in parallel. In addition, the blocks of the process need not be performed in the order shown and/or one or more blocks of the process need not be performed and/or can be replaced by other operations.

In the example of FIG. 11, at block 1102, a device (e.g., a provider router, such as provider router P2 of FIG. 5, which may be a node of an MPLS network) may receive a packet (e.g., incoming packet 502 of FIG. 5) that includes one or more labels (e.g., an L1 label and a PW label, in some examples) from a second device (e.g., a provider router, such as provider router P1 of FIG. 5) over a network. For example, each of the one or more labels may identify a path through the network for the packet. For example, a label may identify a path through the network by identifying a Forwarding Equivalence Path (FEC), which may be a class of packets that are forwarded over the same path. A path through the network may be, for example, a particular sequence of routers (e.g., label switched routers having properties defined in RFC 3031) and/or other devices connected to the network. For example, there may be multiple routers and/or other device connected to network that can participate in forwarding a packet from a source device to a destination device. However, all of the routers and/or other device may not be needed for forwarding the packet, and/or some paths through the routers and/or other devices may be more efficient that other paths through the routers and/or other devices at all times or at various times (e.g., depending on the physical locations, the capabilities, and/or congestion at each of the routers and/or other devices). For example, a path may be a path as defined in RFC 3031 in one or more implementations. A label may identify a particular sequence of the routers and/or other device connected to the network through which a particular packet is forwarded between a source device and a destination device.

At block 1104, the device may detect congestion on the network. In various implementations, detecting congestion may include, for example, detecting a saturated network interface, detecting an increase in latency, detecting an increase in buffer filling (e.g., a queue depth increase, such as above a threshold), and/or detecting an increase in packet loss. In various implementations, detecting congestion may include detecting congestion by a device that is experiencing the congestion (e.g., by detecting a queue depth at the device that is above a threshold depth or by detecting saturation on a network interface at the device), or may include detecting congestion, by a device, that is occurring at another device (e.g., by detecting packet loss in communications from the other device).

At block 1106, the device may generate a first copy of the packet. For example, generating the first copy of the packet may include generating a switch copy 504 of the packet, as discussed herein in connection with FIG. 5.

At block 1108, the device may perform an action (e.g., a label action) on one of the one or more labels of the first copy of the packet. In one or more implementations, the action may include at least one of: adding a first new label to the one or more labels, swapping one of the one or more labels with a second new label, and removing one of the one or more labels. For example, performing the action may include swapping the one of the one or more labels with the second new label (e.g., swapping an L1 label with an L1' label). In other examples, performing an action may include pushing (adding) a label to a packet (e.g., to the top of a label stack of the packet), or popping (removing) a label from a packet (e.g., from the top of a label stack of the packet).

At block 1110, the device may generate, responsive to detecting the congestion, a second copy of the packet. For example, generating the second copy of the packet may include generating a cloned copy 500 of the packet, as discussed herein in connection with FIG. 5.

At block 1112, the device may add congestion information into the second copy of the packet. For example, the congestion information may include a congestion label (e.g., a congestion notification label, or CNL, as described herein) and a congestion header (e.g., a congestion notification header, or CN header, as described herein). For example, the congestion label may indicate that the congestion header is present (e.g., after the congestion label) in the second copy of the packet. In one or more implementations, the device may also add an extension label (XL) into the second copy of the packet between the one or more labels and the congestion label.

The congestion header may include an indicator (e.g., a Msg_type) of a direction of the packet through the network. For example, the indicator (e.g., a Msg_type of zero) may indicate a direction toward a destination (e.g., a provider edge router, such as provider edge router PE2, or a client edge router, such as client edge router CE2 of FIG. 5) of the packet. As discussed herein, the congestion header may include additional information, such as a version, a queue_id, a device_ID, opaque_data/MMU_stat, an ingress port identifier, and/or an egress port identifier.

At block 1114, the device may perform the action on the second copy of the packet. For example, performing the action on the second copy of the packet may include swapping the one of the one or more labels with another label in the second copy of the packet (e.g., by swapping an L1 label with an L1' label).

At block 1116, the device may provide the first copy and the second copy including the congestion information to a third device (e.g., a provider router, such as provider router P3 of FIG. 5) over the network. In one or more implementations, the packet may include a payload, the device may include the payload in the first copy of the packet and truncate the payload in the second copy of the packet.

In one or more implementations, the device may be a congestion detection router of an MPLS network. In one or more implementations, the device may also store a copy of the packet. In one or more implementations, the device may assign a highest priority to the second copy of the packet. In one or more implementations, the device may direct the second copy of the packet to a same egress PE router as the first copy of the packet.

In one or more implementations, the process 1100 may also include, by the third device: receiving the first copy and the second copy including the congestion information from the first device over the network; performing a second action (e.g., a second label action, such as popping the L1' label) on each of the first copy and the second copy; providing the first copy and the second copy having had the second action performed thereon to a fourth device (e.g., a provider edge router, such as PE2 of FIG. 6) over the network; generating an additional packet (e.g., congestion notification message 600 of FIG. 6) having a modified version of the congestion information (e.g., with Msg_type of one) and an additional label (e.g., L2) different from the one or more labels; and providing the additional packet to the first device over the network. The second action may include at least one of: adding a third new label to the one or more labels, swapping one of the one or more labels with a fourth new label, and removing one of the one or more labels. For example, the second action may include removing (e.g., popping) the third new label (e.g., an L1' label) from the one or more labels.

In one or more implementations, the process 1100 may also include, by the first device: performing a third action (e.g., a third label action, such as swapping the L2 label with an L2' label) on the additional packet having the modified version of the congestion information; and providing the additional packet including the modified version of the congestion information and having had the third action performed thereon to the second device over the network (e.g., as discussed herein in connection with FIG. 8). The third action may include at least one of: adding a fifth new label to the one or more labels, swapping one of the one or more labels with a sixth new label, and removing one of the one or more labels. For example, the third action may include swapping one of the one or more labels (e.g., an L2 label) with the sixth new label (e.g., an L2' label).

In one or more implementations, the process 1100 may also include, by the second device: receiving the additional packet including the modified version of the congestion information and having had the third action performed thereon; and reducing a transmission rate to the first device responsive to the congestion information (e.g., as described herein in connection with FIG. 9). In one or more implementations, the process 1100 may also include, by the second device: receiving a further additional packet (e.g., the congestion notification message 700) including the modified version of the congestion information from the first device; performing a fourth action (e.g., a fourth label action, such as popping the L2' label) on the further additional packet including the modified version of the congestion information; and providing the further additional packet including the modified version of the congestion information and having had the fourth action performed thereon to a fifth device (e.g., a provider edge router, such as PE1) over the network (e.g., as described herein in connection with FIG. 9). The fourth action may include at least one of: adding a seventh new label to the one or more labels, swapping one of the one or more labels with an eighth new label, and removing one of the one or more labels. For example, performing the fourth action may include removing the one of the one or more labels (e.g., removing the L2' label that was swapped into the label stack in the third action). In one or more implementations, the process 1100 may also include, by the fifth device, reducing a transmission rate to the first device responsive to the modified version of the congestion information (e.g., as described herein in connection with FIG. 10).

Figure 12:
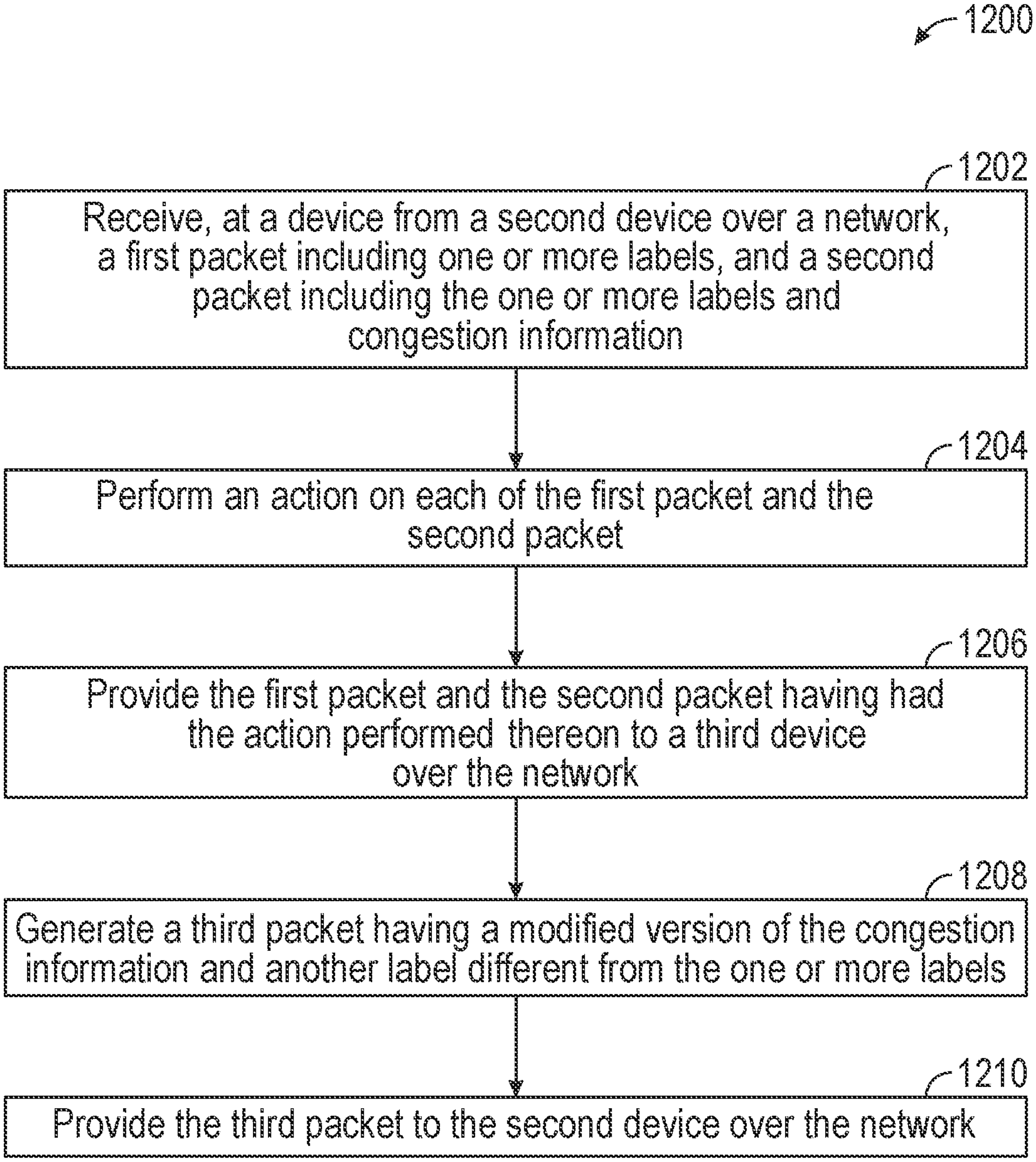
FIG. 12 illustrates another flowchart of illustrative operations that may be performed for congestion notification in accordance with aspects of the subject technology.

FIG. 12 is a flowchart illustrating another example process for congestion notification according to aspects of the subject technology. For example, the process 1200 of FIG. 12 may be performed by a congestion notification node of an MPLS network in one or more implementations. For explanatory purposes, the blocks of the process illustrated in FIG. 12 are described herein as occurring in serial, or linearly. However, multiple blocks of the process may occur in parallel. In addition, the blocks of the process need not be performed in the order shown and/or one or more blocks of the process need not be performed and/or can be replaced by other operations.

Process 1200 depicted in FIG. 12 includes, at block 1202, a device (e.g., a provider router, such as provider router P3 of FIG. 6, which may be a node of an MPLS network) may receive, from a second device (e.g., a provider router, such as provider router P2 of FIG. 6) over a network: a first packet (e.g., switch copy 504) including one or more labels, and a second packet (e.g., cloned copy 500) including the one or more labels (e.g., an L1' label and a PW label) and congestion information. For example, each of the one or more labels may identify a path through the network for the packet. A path through the network may be, for example, a sequence of routers (e.g., label switched routers having properties defined in RFC 3031) and/or other devices connected to the network.

For example, the congestion information may include a congestion label (e.g., a congestion notification label, or CNL, as described herein) and a congestion header (e.g., a congestion notification header, or CN header, as described herein). For example, the congestion label may indicate that the congestion header is present (e.g., after the congestion label) in the second packet. The congestion header may include an indicator (e.g., a Msg_type, such as Msg_type having a value of zero) of a direction of the second packet through the network (e.g., a direction toward a destination, such as a provider edge router such as provider edge router PE2, or a client edge router such as client edge router CE2, of the packet). In one or more implementations, the device may also add an extension label (XL) into the second packet between the one or more labels and the congestion label. As discussed herein, the congestion header may include additional information, such as a version, a queue_id, a device_ID, opaque_data/MMU_stat, an ingress port identifier, and/or an egress port identifier.

At block 1204, the device may perform an action (e.g., a label action) on each of the first packet and the second packet. In one or more implementations, performing the action on each of the first packet and the second packet may include at least one of: adding a first new label to the one or more labels, swapping one of the one or more labels with a second new label, and removing one of the one or more labels. For example, the action may include removing (e.g., popping) one of the one or more labels from the first packet and the second packet. For example, the action may include removing an L1' label from each of the first packet and the second packet, as in the example of FIG. 6).

At block 1206, the device may provide the first packet and the second packet having had the action performed thereon to a third device (e.g., a provider edge router, such as provider edge router PE2 of FIG. 6) over the network.

At block 1208, the device may generate a third packet (e.g., congestion notification message 600) having a modified version of the congestion information and another label different from the one or more labels. For example, the modified version of the congestion information may include the congestion label and a modified version of the congestion header. For example, the modified version of the congestion header may include another indicator (e.g., a Msg_type having a value of one) that indicates a direction toward a source (e.g., a provider edge router such as provider edge router PE1, or a client edge router such as client edge router CE1) of the first packet. In one or more exemplary use cases, the other label different from the one or more labels may be an L2 label, as in the example of FIG. 6.

At block 1210, the device may provide the third packet to the second device over the network. For example, the device may provide the third packet to a preceding node, such as a preceding provider router, or a provider edge route (e.g., P2 of FIG. 6). In one or more implementations, the device may be a congestion notification router of an MPLS network. In one or more implementations, the device may also store a copy of the first packet and/or the second packet. In one or more implementations, the device may assign a highest priority to the third packet. In one or more implementations, the device may direct the second copy of the packet to a same egress PE router as the first copy of the packet.

Figure 13:
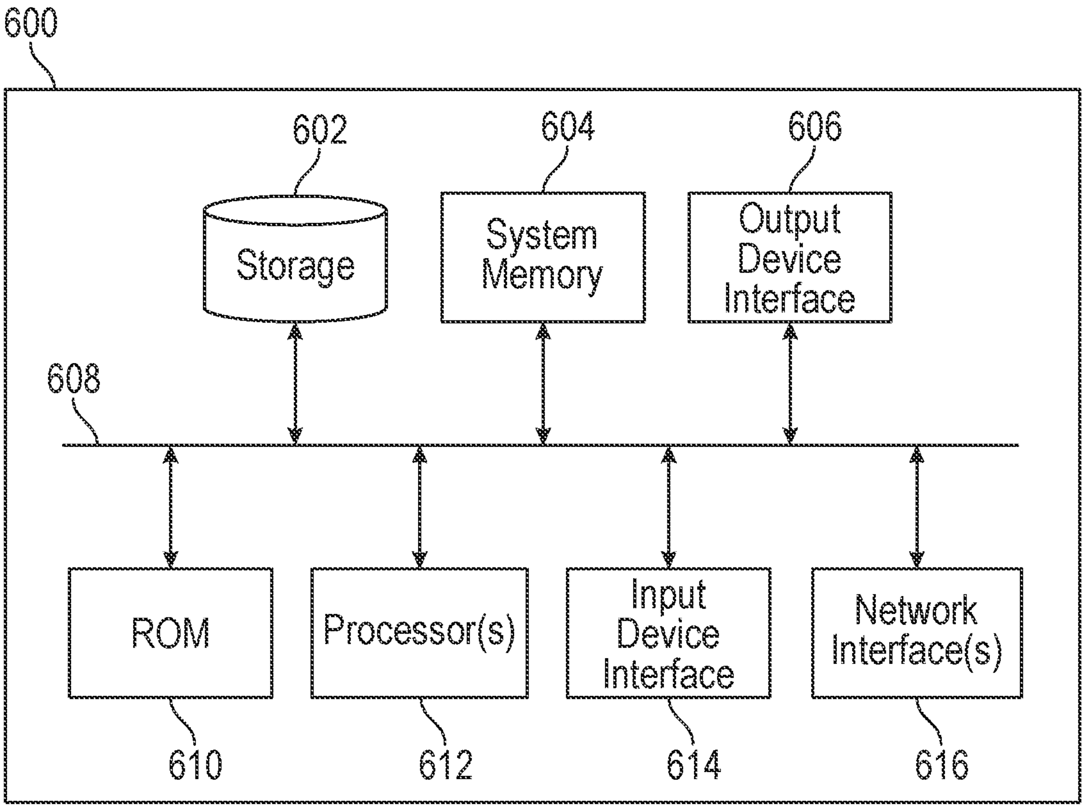
FIG. 13 is a block diagram illustrating components of an electronic system with which one or more implementations of the subject technology may be implemented.

FIG. 13 illustrates an electronic system 1300 with which one or more implementations of the subject technology may be implemented. The electronic system 1300 may include various types of computer readable media and interfaces for various other types of computer readable media. The electronic system 1300 includes a bus 1308, one or more processing unit(s) 1312, a system memory 1304 (and/or buffer), a ROM 1310, a permanent storage device 1302, an input device interface 1314, an output device interface 1306, and one or more network interfaces 1316, or subsets and variations thereof.

The bus 1308 collectively represents all system, peripheral, and chipset buses that communicatively connect the numerous internal devices of the electronic system 1300. In one or more implementations, the bus 1308 communicatively connects the one or more processing unit(s) 1312 with the ROM 1310, the system memory 1304, and the permanent storage device 1302. From these various memory units, the one or more processing unit(s) 1312 retrieves instructions to execute and data to process in order to execute the processes of the subject disclosure. The one or more processing unit(s) 1312 can be a single processor or a multi-core processor in different implementations.

The ROM 1310 stores static data and instructions that are needed by the one or more processing unit(s) 1312 and other modules of the electronic system 1300. The permanent storage device 1302, on the other hand, may be a read-and-write memory device. The permanent storage device 1302 may be a non-volatile memory unit that stores instructions and data even when the electronic system 1300 is off. In one or more implementations, a mass-storage device (such as a magnetic or optical disk and its corresponding disk drive) may be used as the permanent storage device 1302.

In one or more implementations, a removable storage device (such as a floppy disk, flash drive, and its corresponding disk drive) may be used as the permanent storage device 1302. Like the permanent storage device 1302, the system memory 1304 may be a read-and-write memory device. However, unlike the permanent storage device 1302, the system memory 1304 may be a volatile read-and-write memory, such as random access memory. The system memory 1304 may store any of the instructions and data that one or more processing unit(s) 1312 may need at runtime. In one or more implementations, the processes of the subject disclosure are stored in the system memory 1304, the permanent storage device 1302, and/or the ROM 1310. From these various memory units, the one or more processing unit(s) 1312 retrieves instructions to execute and data to process in order to execute the processes of one or more implementations.

The bus 1308 also connects to the input and output device interfaces 1314 and 1306. The input device interface 1314 enables a user to communicate information and select commands to the electronic system 1300. Input devices that may be used with the input device interface 1314 may include, for example, alphanumeric keyboards and pointing devices (also called "cursor control devices"). The output device interface 1306 may enable, for example, the display of images generated by electronic system 1300. Output devices that may be used with the output device interface 1306 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 13, the bus 1308 also couples the electronic system 1300 to one or more networks and/or to one or more network nodes through the one or more network interface(s) 1316. In this manner, the electronic system 1300 can be a part of a network of computers (such as a LAN, a wide area network ("WAN"), or an Intranet, or a network of networks, such as the Internet. Any or all components of the electronic system 1300 can be used in conjunction with the subject disclosure.

Implementations within the scope of the present disclosure can be partially or entirely realized using a tangible computer-readable storage medium (or multiple tangible computer-readable storage media of one or more types)

encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms “base station”, “receiver”, “computer”, “server”, “processor”, and “memory” all refer to electronic or other technological devices. These terms exclude people or groups of people. For the purposes of the specification, the terms “display” or “displaying” means displaying on an electronic device.

As used herein, the phrase “at least one of” preceding a series of items, with the term “and” or “or” to separate any of the items, modifies the list as a whole, rather than each member of the list (i.e., each item). The phrase “at least one of” does not require selection of at least one of each item listed; rather, the phrase allows a meaning that includes at least one of any one of the items, and/or at least one of any combination of the items, and/or at least one of each of the items. By way of example, the phrases “at least one of A, B, and C” or “at least one of A, B, or C” each refer to only A, only B, or only C; any combination of A, B, and C; and/or at least one of each of A, B, and C.

The predicate words “configured to”, “operable to”, and “programmed to” do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word “exemplary” is used herein to mean “serving as an example, instance, or illustration”. Any embodiment described herein as “exemplary” or as an “example” is not necessarily to be construed as preferred or advantageous over other implementations. Furthermore, to the extent that the term “include”, “have”, or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising: a memory storing instructions; and processing circuitry, wherein the instructions, when executed by the processing circuitry, cause the processing circuitry to perform operations comprising: receiving a packet comprising one or more labels from a second device over a network, wherein each of the one or more labels identifies a path through the network for the packet; detecting congestion on the network; generating a first copy of the packet; performing an action on the one or more labels of the first copy of the packet, wherein the action comprises at least one of: adding a first new label to the one or more labels, swapping one of the one or more labels with a second new label, and removing one of the one or more labels; generating, responsive to detecting the congestion, a second copy of the packet; adding congestion information into the second copy of the packet; performing the action on the second copy of the packet; and providing the first copy and the second copy including the congestion information to a third device over the network.

2. The device of claim 1, wherein each of the one or more labels identifies a Forwarding Equivalence Class (FEC) for Multiprotocol Label Switching (MPLS), and wherein performing the action comprises swapping the one of the one or more labels with the second new label.

3. The device of claim 1, wherein the congestion information comprises a congestion label and a congestion header.

4. The device of claim 3, wherein the congestion label indicates that the congestion header is present in the second copy of the packet.

5. The device of claim 4, wherein the congestion header comprises an indicator of a direction of the packet through the network.

6. The device of claim 5, wherein the indicator indicates a direction toward a destination of the packet.

7. The device of claim 1, wherein the packet comprises a payload, and wherein the operations further comprise including the payload in the first copy of the packet and truncating the payload in the second copy of the packet.

8. A device, comprising: a memory storing instructions; and processing circuitry, wherein the instructions, when executed by the processing circuitry, cause the processing circuitry to perform operations comprising: receiving, from a second device over a network: a first packet comprising one or more labels each of which identifies a path through the network for the first packet, and a second packet comprising the one or more labels and congestion information; performing an action on each of the first packet and the second packet, wherein the action comprises at least one of: adding a first new label to the one or more labels, swapping one of the one or more labels with a second new label, and removing one of the one or more labels; providing the first packet and the second packet having had the action performed thereon to a third device over the network; generating a third packet having a modified version of the congestion information and another label different from the one or more labels; and providing the third packet to the second device over the network.

9. The device of claim 8, wherein each of the one or more labels identifies a Forwarding Equivalence Class (FEC) for Multiprotocol Label Switching (MPLS), and wherein performing the action on each of the first packet and the second packet comprises removing the one of the one or more labels from the first packet and the second packet.

10. The device of claim 8, wherein the congestion information comprises a congestion label and a congestion header.

11. The device of claim 10, wherein the congestion label indicates that the congestion header is present in the second packet.

12. The device of claim 11, wherein the congestion header comprises an indicator of a direction of the second packet through the network.

13. The device of claim 12, wherein the indicator indicates a direction toward a destination of the second packet.

14. The device of claim 13, wherein the modified version of the congestion information comprises the congestion label and a modified version of the congestion header, the modified version of the congestion header comprising an other indicator that indicates a direction toward a source of the first packet.

15. The device of claim 8, wherein the first packet comprises a payload and wherein the second packet and the third packet each comprise a truncated version of the payload.

16. A system, comprising: a first device configured to: receive a packet comprising one or more labels from a second device over a network, wherein each of the one or more labels identifies a path through the network for the packet; detect congestion on the network; generate a first copy of the packet; perform a first action on one of the one or more labels of the first copy of the packet, wherein the first action comprises at least one of: adding a first new label to the one or more labels, swapping one of the one or more labels with a second new label, and removing one of the one or more labels; generate, responsive to detecting the congestion, a second copy of the packet; add congestion information into the second copy of the packet; perform the first action on the second copy of the packet; and provide the first copy and the second copy including the congestion information to a third device over the network.

17. The system of claim 16, further comprising the third device, wherein the third device is configured to: receive the first copy and the second copy including the congestion information from the first device over the network; perform a second action on each of the first copy and the second copy, wherein the second action comprises at least one of: adding a third new label to the one or more labels, swapping one of the one or more labels with a fourth new label, and removing one of the one or more labels; provide the first copy and the second copy having had the second action performed thereon to a fourth device over the network; generate an additional packet having a modified version of the congestion information an additional label different from the one or more labels; and provide the additional packet to the first device over the network.

18. The system of claim 17, wherein the first device is further configured to: perform a third action on the additional packet having the modified version of the congestion information, wherein the third action comprises at least one of: adding a fifth new label to the one or more labels, swapping one of the one or more labels with a sixth new label, and removing one of the one or more labels; and provide the additional packet including the modified version of the congestion information and having had the third action performed thereon to the second device over the network.

19. The system of claim 18, further comprising the second device, wherein the second device is configured to: receive the additional packet including the modified version of the congestion information and having had the third action performed thereon; and reduce a transmission rate to the first device responsive to the modified version of the congestion information.

20. The system of claim 19, wherein the second device is further configured to: receive a further additional packet including the modified version of the congestion information from the first device; perform a fourth action on the further additional packet including the modified version of the congestion information, wherein the fourth action comprises at least one of: adding a seventh new label to the one or more labels, swapping one of the one or more labels with an eighth new label, and removing one of the one or more labels; and provide the further additional packet including the modified version of the congestion information and having had the fourth action performed thereon to a fifth device over the network.

* * * * *